United States Patent
Bhogal et al.

(10) Patent No.: US 6,806,888 B2
(45) Date of Patent: Oct. 19, 2004

(54) METHOD, APPARATUS, AND COMPUTER PROGRAM PRODUCT FOR GENERATING, FROM FIRST INFORMATION FOR A FIRST IMAGE, SECOND INFORMATION FOR A SECOND IMAGE CORRESPONDING TO A PORTION OF THE FIRST IMAGE

(75) Inventors: Kulvir Singh Bhogal, Fort Worth, TX (US); Nizamudeen Ishmael, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 10/046,942

(22) Filed: Jan. 15, 2002

(65) Prior Publication Data

US 2003/0132948 A1 Jul. 17, 2003

(51) Int. Cl.⁷ ................................. G09G 5/00
(52) U.S. Cl. ............... 345/660; 345/723; 345/800; 345/823; 348/561; 348/794
(58) Field of Search ................. 345/660, 723, 345/800, 823; 348/561, 794

(56) References Cited

U.S. PATENT DOCUMENTS

| | | | |
|---|---|---|---|
| 3,838,525 A | | 10/1974 | Harvey .................. 35/9 A |
| 4,148,073 A | * | 4/1979 | Slobodzian et al. ........ 348/798 |
| 4,467,349 A | | 8/1984 | Maloomian .................. 358/93 |
| 4,845,634 A | * | 7/1989 | Vitek et al. .................. 700/97 |
| 5,101,197 A | | 3/1992 | Hix et al. .................. 340/784 |
| 5,187,776 A | * | 2/1993 | Yanker .................. 345/800 |
| 5,422,827 A | | 6/1995 | Niehaus .................. 364/514 |
| 5,574,572 A | | 11/1996 | Malinowski et al. ....... 358/451 |
| 5,673,204 A | | 9/1997 | Klingelhofer ........... 364/514 A |
| 5,710,573 A | | 1/1998 | Hung et al. .................. 345/127 |
| 5,790,714 A | | 8/1998 | McNeil et al. ............. 382/300 |
| 5,898,419 A | * | 4/1999 | Liu .................. 345/660 |
| 5,917,480 A | | 6/1999 | Tafoya et al. .............. 345/342 |
| 6,014,125 A | | 1/2000 | Horbert .................. 345/127 |
| 6,184,905 B1 | | 2/2001 | Hartog .................. 345/521 |
| 6,226,040 B1 | | 5/2001 | Kuo et al. .................. 348/446 |
| 6,476,873 B1 | * | 11/2002 | Maeng .................. 348/561 |
| 6,493,036 B1 | * | 12/2002 | Fernandez .................. 348/561 |
| 6,501,441 B1 | * | 12/2002 | Ludtke et al. ............. 345/1.1 |
| 6,552,750 B1 | * | 4/2003 | Suen et al. ................. 348/561 |

FOREIGN PATENT DOCUMENTS

JP          10079890         3/1989         ............. 5/253

OTHER PUBLICATIONS

Holzman, T.G., "On–line Highlighting and Margin Notes," *IBM Technical Disclosure Bulletin*, vol. 34, No. 10A, Mar., 1992, pp. 481–484.

Baber, R.L., and Pascoe, R.A., "Automated Capture of Multimedia Resources," *IBM Technical Disclosure Bulletin*, vol. 34, No. 11, Apr., 1992, p. 14.

Web Site for "Deuce® HD," http://www.commspecial.com/deuce—hd.html.

* cited by examiner

*Primary Examiner*—Matthew C. Bella
*Assistant Examiner*—Po Wei Chen
(74) *Attorney, Agent, or Firm*—Mark S. Walker; Anthony V. S. England

(57) ABSTRACT

In one aspect and form of the invention, a converter receives first visual information from a computer system. The first visual information is conventionally used for generating an image for a first display element. The converter receives first selection data from the computer system identifying at least a first portion of the image, and generates second visual information for generating a second image for a second display element. The second image corresponds to the first portion of the first image. The size of the second image relative to the second display element is controllable by a user and may be selected to be different than the size of the selected portion of the first image relative to the entire first image or relative to the first display element. For example, the second image may be of a size corresponding to the size of substantially the entire second display element.

3 Claims, 5 Drawing Sheets

METHOD, APPARATUS, AND COMPUTER PROGRAM PRODUCT FOR GENERATING, FROM FIRST INFORMATION FOR A FIRST IMAGE, SECOND INFORMATION FOR A SECOND IMAGE CORRESPONDING TO A PORTION OF THE FIRST IMAGE

BACKGROUND

1. Field of the Invention

This invention relates generally to selectively generating visual display information for a computer system, and, more particularly, to generating, from first information for a first display element image, second information for a second display element image that is a selected portion of the first display element image.

2. Related Art

In public speaking, it is common for a presenter to have visual material on his or her computer, which is very often a notebook computer, and to display the material on both the speaker's computer monitor and a larger, audience monitor. Computers, and particularly notebook computers, have improved in recent years with regard to computational power and capability to quickly render high resolution images. There have also been improvements in size and resolution of monitors included in notebook computers. With these improvements, computers are potentially even more useful for presentations. However, there have not been correspondingly significant improvements in the way that information from a speaker's computer is displayed on an audience monitor. Therefore a need exists for such improvements.

SUMMARY

The foregoing need is addressed in the present invention. In one aspect of the invention according to the context described above, information may be selectively displayed on a speaker's monitor in addition to that which is displayed on an audience monitor. Information that is hidden on the speaker's monitor may also be selectively displayed on the audience monitor. In another aspect, one selected part of information for the speaker's monitor may be selectively sent to and properly sized for one audience monitor, another part sent to and properly sized for another audience monitor, and so on.

Stated more generally, in one aspect of the invention a converter is operable to receive first visual information from a computer system. The first visual information includes information for generating an image for a first display element. The converter is also operable to receive first selection data from the computer system selectively identifying at least a first portion of the image, and to generate second visual information for a second display element image. The second image corresponds to the selected first portion of the first image. The size of the second image relative to the second display element is controllable by a user and may be selected to be different than the size of the selected portion of the first image relative to the entire first image or relative to the first display element. For example, the second image may be of a size corresponding to the size of substantially the entire second display element.

In another aspect, the converter is operable to receive second selection data from the computer system defining a second portion of the first image, and to generate third graphical information for a third display element image. The third image corresponds to the second portion of the first image.

In one aspect, the first graphical information is provided by a video signal output by a video graphics adapter for the computer system.

In another aspect, a program runs on the computer system for receiving user inputs, including an input selecting a first portion of the first image.

In another aspect, the input selecting the first portion of the first image includes identification of a window of or coordinates within the first image.

Other aspects, as well as advantages and objects of the invention will become apparent upon reading the following detailed description and upon reference to the accompanying drawings.

DETAILED DESCRIPTION

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
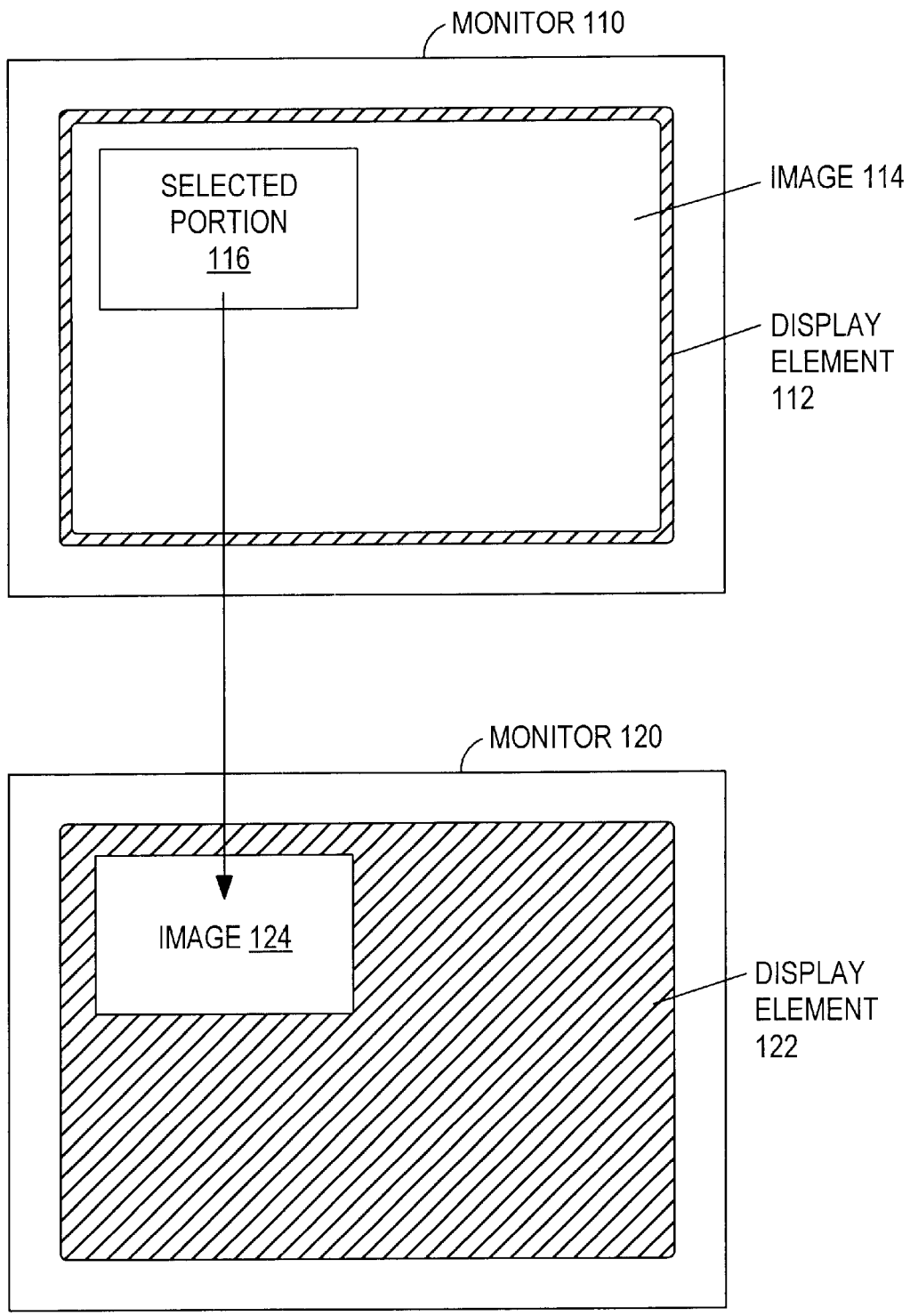
FIG. 1 illustrates an image substantially filling a display element of a first monitor, a selected portion of the image, and another image, corresponding to the selected portion, on a second display element of a second monitor.

Referring now to FIG. 1, an image 114 is shown substantially filling a display element 112 of a first monitor 110, which may be a public speaker's monitor. A selected portion 116 is shown, which is only a part of the image 114. Another image 124 is shown on a display element 122 of a second monitor 120, which may be a monitor for the audience. The image 124 corresponds to the selected portion 116 of the image 114, i.e., an image within the image 114. Thus, the image of the selected portion 116 of the first image 114 is displayed on the second monitor 120, as image 124, but the rest of the image 114 is not.

Note that the size of the second image 124 relative to the display element 122 is essentially the same as that of the selected portion 116 relative to the display element 112. Thus the second image 124 does not fill the display element 122. In FIG. 1, the unfilled portion of the display element 122 has no image. This is not well suited to the problem at hand.

Figure 2:
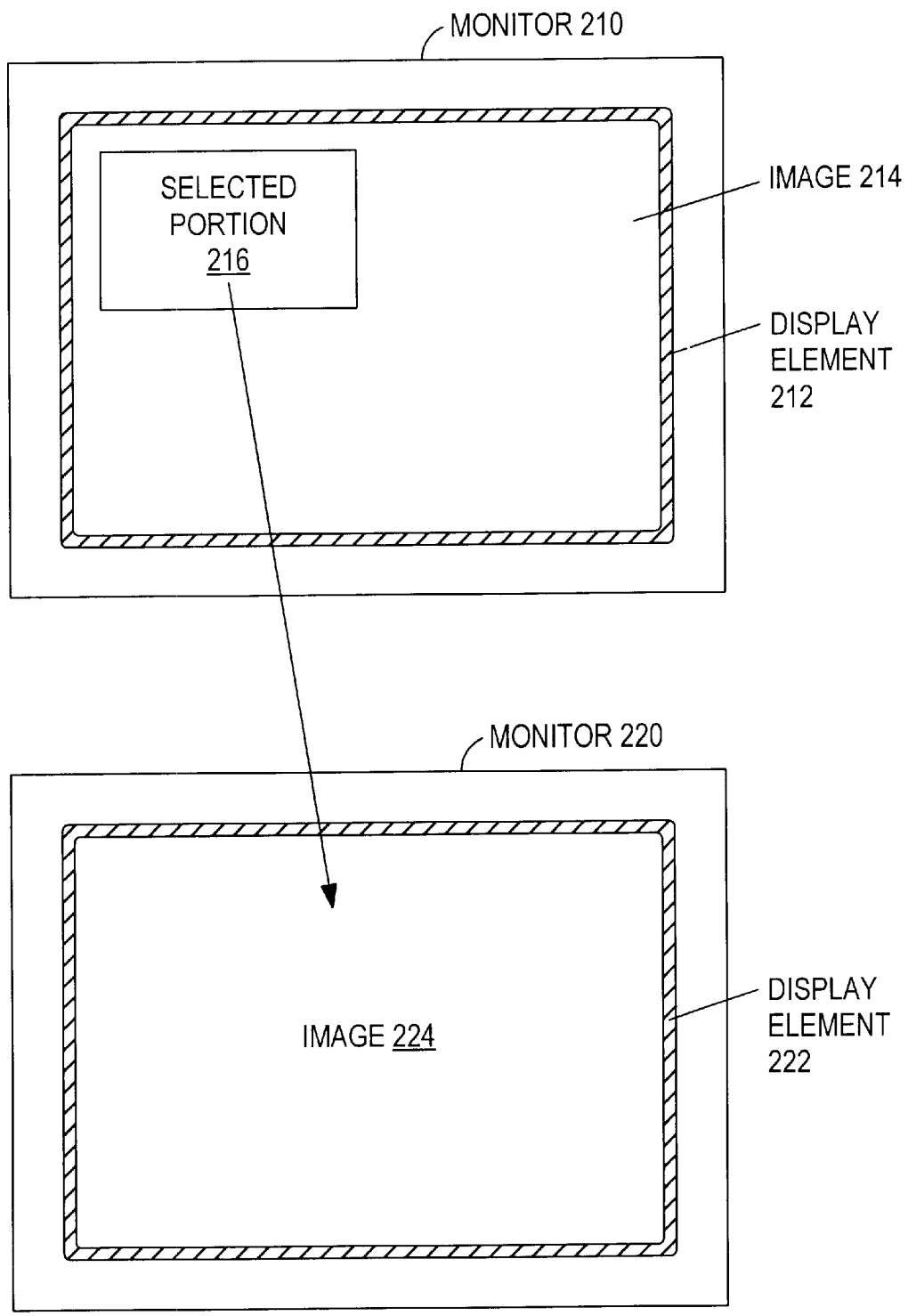
FIG. 2 illustrates an image substantially filling a display element of a first monitor, a selected portion of the image, and another image, corresponding to the selected portion, on a second display element of a second monitor, according to an embodiment of the present invention.

Referring now to FIG. 2, a more advantageous arrangement is depicted, according to an embodiment of the invention. As in FIG. 1, an image 214 substantially fills the display element 212 of a first monitor 210, and the image of a selected portion 216 is only a part of the image 214.

Likewise, image 224, displayed on display element 222 of a second monitor 220, corresponds not to the entire image 214, but rather to the selected portion 216 of the image 214, i.e., an image within the image 214. Unlike the arrangement of FIG. 1, however, in FIG. 2 the image 224 is of a size corresponding to the size of the display element 222 of the second monitor 220. That is, the image of selected portion 216, which is only a small part of the display element 212 of monitor 210, is blown up as image 224 to substantially fill the display element 222 of the second monitor 220. Alternatively, the image 224 may not fill the entire display element 222, but nevertheless its size is variable, as determined by a user selection, so that its size relative to the display element 222 can be different than that of selected portion 216 relative to the display element 212 or relative to image 214.

In the arrangement of FIG. 1, if the second display element 122 is bigger than the first display element 112, then the second image 124 will be relatively bigger than the selected portion 116 of the first image 114. Moreover, if the second display element 122 is a great deal larger than the display element 112, then the second image 124 may be bigger than the entire first image 114, even though the second image 124 corresponds in visual content to merely the selected portion 116. However, in FIG. 2, the size of image 224 is different than that of the image of portion 216 not merely due to any difference in the sizes of display elements 212 and 222. The size of image 224 may be different than that of portion 216 even in relative terms, that is, over and above any difference in display element sizes. By selective scaling of the image 224, the size of the image 224 relative to the display element 222 may be different than that of selected portion 216 relative to the display element 212 or image 214. For example, in FIG. 2 the area of the image of portion 216 relative to the area of the display element 212 is roughly 1:5, whereas the area of the second image 224 is scaled so that its proportion is substantially 1:1 relative to the area of the second display element 222.

Figure 3:
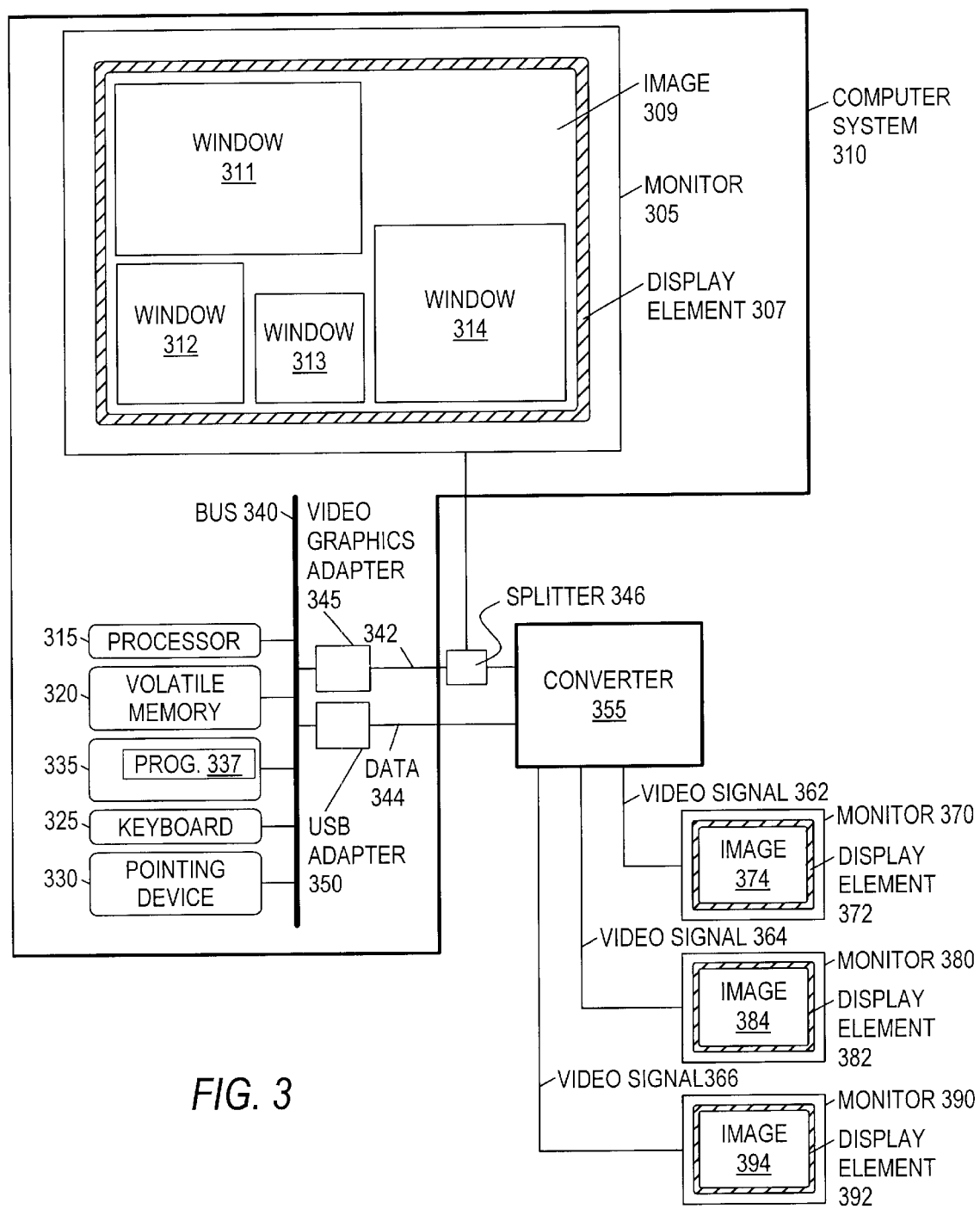
FIG. 3 illustrates a converter communicating with a computer system and monitors, according to an embodiment of the present invention.

Referring now to FIG. 3, a computer system 310 is shown that is generally applicable for the embodiment described. The computer 310 has a processor 315, a volatile memory 320 (that is, RAM, for example), a keyboard 325, a pointing device 330, such as a mouse, trackball, etc., a nonvolatile memory 335 (for example, ROM, hard disk, floppy disk, CD-ROM, etc.), and a monitor 305. The monitor 305 receives a video signal 342 from video graphics adapter 345. The memory 320 and 335 are for storing a program 337 for controlling the processor 315, and the processor 315 is operative with the program 337 to perform as described herein. These components in the system 310 are interconnected by bus 340. The keyboard 325 is a device of the sort that is sometimes referred to as a "data entry" device. In other embodiments, the system 310 may include a data entry device such as a microphone for receiving voice commands, or a keypad.

Converter 355 is operable to receive visual information from the computer system 310, that is, information for generating a visual image, such as image 309 on display element 307. In the embodiment, the visual information is provided by the video signal 342 output by the video graphics adapter 345 for the computer system 310. A splitter 346 splits the video signal 342 so that it can drive both the monitor 305 and the converter 355. The converter 355 is also operable to receive selection data 344 from the computer system 310, that is, data identifying at least a first portion of the image 309. The selection data is generated by the program 337 running on the computer system 310, responsive to a user input selecting a first image portion for displaying as another image. In the illustrated embodiment, the converter 355 is operable to receive selection data 344 defining three portions of the image 309. In the embodiment of FIG. 3, the three selected portions correspond to operating system or application defined windows, windows 311 through 313.

Window 314 in the embodiment illustrated is for displaying a graphical user interface ("GUI") generated by the program 337. Using this GUI, the user selects portions of image 309 and otherwise interacts with the program 337, which in turn communicates with the converter 355. In one alternative, the user selects a fixed portion of the first image 309 by specifying fixed coordinates within the image 309 on the display element 307, such as with the pointing device 330. The program 337 includes in selection data 344, which it communicates to converter 355, information about these selected coordinates. In another alternative, the user selects a portion of image 309 corresponding to an operating system or application defined window, such as window 311, which is not fixed.

Consider further the case where the user has selected a re-sizable application window of image 309, such as window 311. In this case, if the window 311 is re-sized, the program 337 communicates new coordinates for the boundaries of the window 311 to the converter 355 via data 344, and the converter 355 re-scales the information in video signal 362 for image 374 so that the image 374 still fills the same relative portion of the display element 372 on the second monitor 370, e.g., substantially the entire portion of display element 372 in the instance illustrated in FIG. 3.

Having received the visual information for image 309 from video signal 342, and selection data 344 defining the selected portions of image 309, the converter 355 is operable to generate second, third and fourth visual information for generating respective second, third and fourth images 374, 384 and 394 on display elements 372, 382 and 392 of monitors 370, 380 and 390. (In the embodiment illustrated, the second, third and fourth visual information is included in video signals 362, 364 and 366 respectively.)

Second, third and fourth images 374, 384 and 394 of FIG. 3 correspond to windows 311 through 313 (in the same way that image 224 corresponds to portion 216 in FIG. 2). The converter 355 is operable to selectively scale the second image 374, responsive to user input via program 337, so that the second image 374 relative to the second display element 372 may be different than the size of the selected portion 311 of the first image 309 relative to the entire first image 309 or relative to the first display element 307. Likewise the converter 355 is operable to selectively scale the third image 384, and so on. For example, information in video signal 362 for image 374 may be selectively scaled so that the corresponding selected portion, i.e., window 311, of the first display element 307 image 309 substantially fills the display element 372 on the second monitor 370. Also in similar fashion as previously described, image 374, for example, alternatively may not fill the entire display element 372, but nevertheless its size is variable, as determined by user selection, so that its size relative to the display element 372 can be different than that of the corresponding selected portion of image 309, i.e., window 311, relative to the display element 307.

It should be noted that the windows 311, 312 etc. may partly or even entirely overlap one another, unlike what is shown in FIG. 3. In an embodiment of the present invention, if window 311 is selected for displaying as image 374 on display element 372, then even if window 311 is partly or completely obscured on display element 307 by another one of the windows, window 311 is still displayed in its entirety on display element 372, just as if it were the window on top in image 309. In this embodiment, converter 355 will, of course, receive visual information in addition to, or instead of, the information previously described in video signal 342 for generating image 309 on display element 307. This additional or alternative visual information is included in data 344 from the computer system 310 to the converter 355, in one embodiment.

Figure 4:
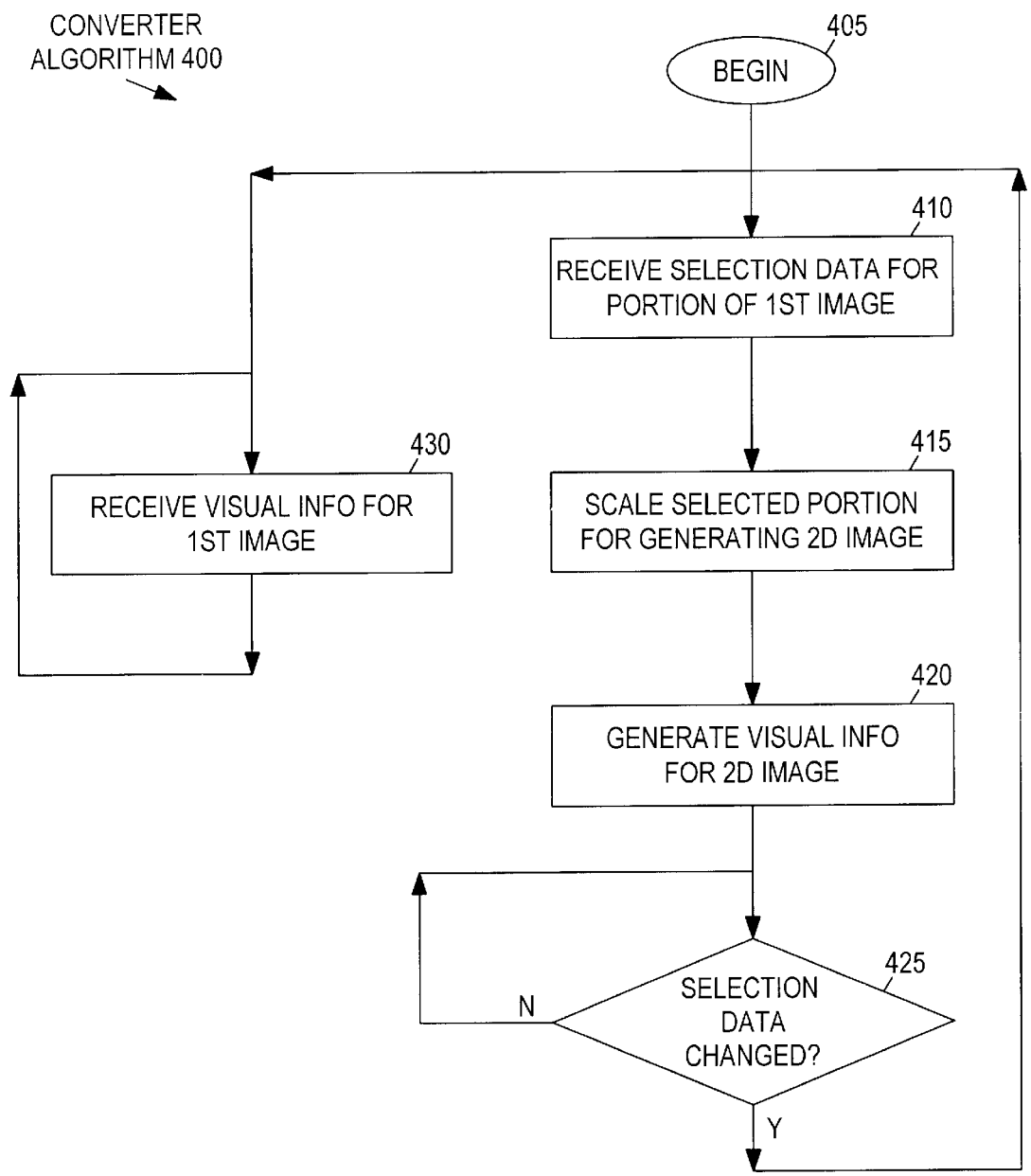
FIG. 4 illustrates aspects of an algorithm for a converter, according to an embodiment of the present invention.

Referring now to FIG. 4, a converter 355 (FIG. 3) algorithm 400 begins at 405, according to an embodiment of the present invention. At 430 the converter receives from the computer system visual information for generating the first image. This information is continually updated. At 410 the converter 355 concurrently receives from the computer system selection data identifying the selected portion of the first image. Then, at 415, the converter scales the selected portion. Then, at 420, the converter generates visual information for generating the second image, that is, on a second display element. Next, at 425, the converter monitors for changes in the selection data. See the description accompanying FIG. 5 for details.) If the data changes, then the converter returns to 410, receives modified selection data, and so on.

Figure 5:
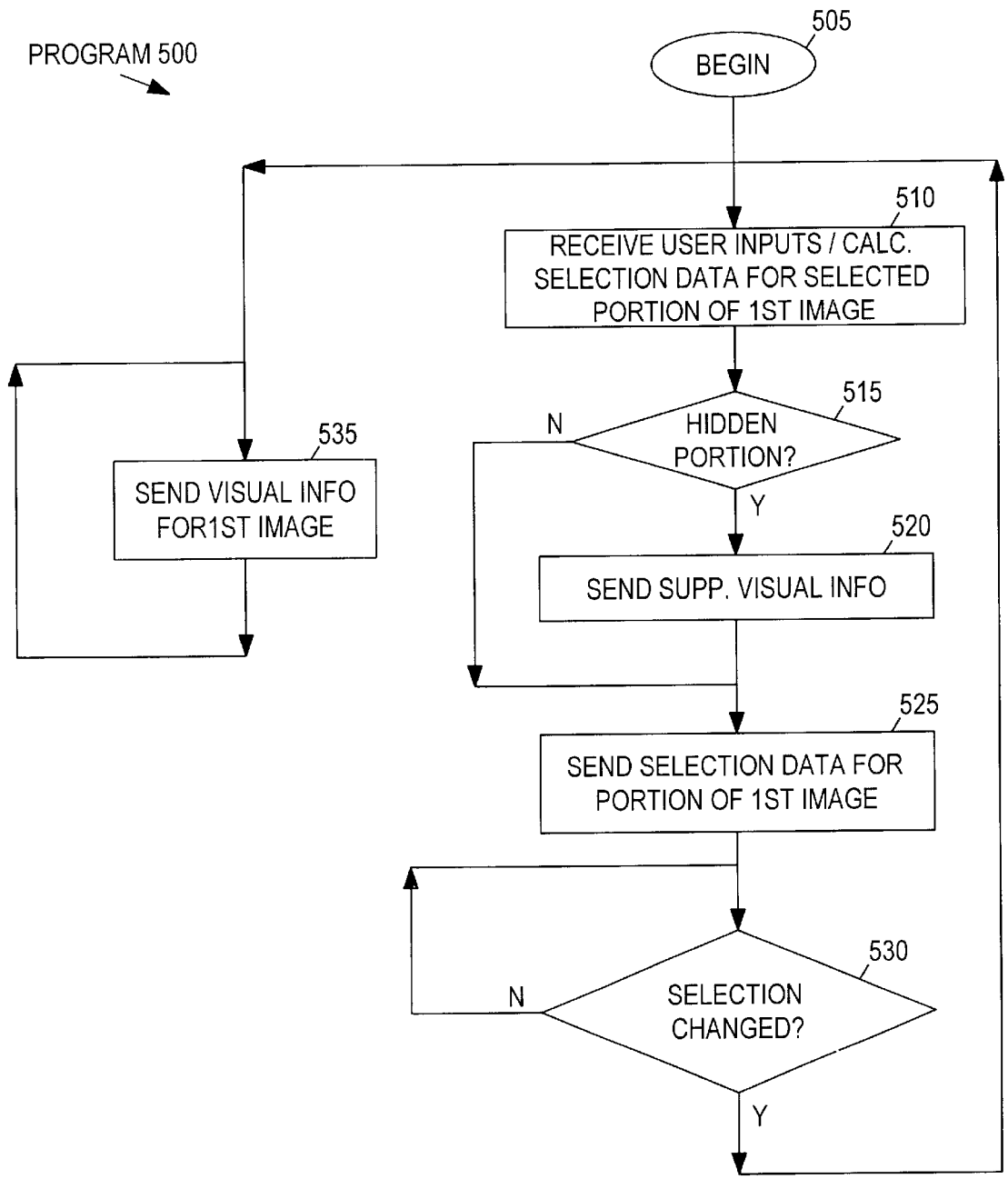
FIG. 5 illustrates aspects of an algorithm for a user interface program, according to an embodiment of the present invention.

Referring now to FIG. 5, a computer program 337 (FIG. 3) algorithm 500 is illustrated, according to an embodiment of the present invention. The algorithm begins at 505. At 535 the program sends visual information for generating the first image. This information is continually updated, as shown. At 510 the program concurrently receives user inputs for selecting a portion of the first image. At 515 a determination is made whether any of the portion is hidden, such as by an overlapping window. If yes, then at 520 the program sends supplemental visual information for generating an image of the hidden portion. If no, then the program skips to 525. At 525 the program sends selection data identifying the selected portion of the first image. At 530 the program monitors for a change in the selection. This arises because the user directly changes coordinates, or, if the selected portion is a window, by the size of the window being changed. If there is a change, then the program returns to 510, where it receives new user inputs responsive to user change or calculates new coordinates responsive to window re-sizing, and so on.

It is important to note that while the present invention has been described in the context of a fully functioning data processing system, those of ordinary skill in the art will appreciate that the processes of the present invention are capable of being distributed in the form of a computer readable medium of instructions in a variety of forms and that the present invention applies equally regardless of the particular type of signal bearing media actually used to carry out the distribution. Examples of computer readable media include RAM, flash memory, recordable-type media, such a floppy disk, a hard disk drive, a ROM, and CD-ROM, and transmission-type media such as digital and analog communications links, e.g., the Internet.

The description of the present embodiment has been presented for purposes of illustration, but is not intended to be exhaustive or to limit the invention to the form disclosed. Many additional aspects, modifications and variations are also contemplated and are intended to be encompassed within the scope of the following claims. For example, in one embodiment the converter 355 (FIG. 3), or at least aspects of it, is implemented in software. Regardless of whether the converter is implemented in software or hardware, in various embodiments the converter 355 is included entirely or partly within the computer system 310, rather than externally as shown in the embodiment of FIG. 3. Likewise, in various other embodiments the splitter 346 is included in the computer system 310 or the converter 355.

Also, in various embodiments the converter receives certain information in a digital format for the computer system monitor video image, instead of receiving a video signal in an analog format output by a video graphics adapter. Also, in various embodiments the monitor 305 of the computer system 310 and the monitors 370, etc. receiving the converter 355 outputs are of a variety of types, including types that use a cathode ray tube (※CRT※), liquid crystal display, field emission device display, projection display or some other type of display element 307, 372, etc.

What is claimed is:

1. An apparatus comprising:
   a computer system having a first display element operable for displaying a first image on the display element for viewing by a first user, wherein the computer system provides an interface far receiving from the user selections of one or more portions of the image for displaying to an audience on respective one or more audience display elements, wherein the entire first image is displayed in view of the first user and only the selected portions are displayed in view of an audience;
   a converter, wherein the computer system is operable to send to the converter first information for the first display element image and selection data identifying the portions of the image, and the converter is operable to responsively generate second information for one or more audience display element images corresponding to the user-selected one or more portions of the first image, and wherein the computer system is operable to receive user selections of scaling for the respective audience display element images and responsively send scaling information to the converter, the converter being operable to selectively scale the audience display element images so that the audience display element image sizes relative to the audience display elements may be different than the respective sizes of the selected portions of the first image relative to the entire first image or relative to the first display element, wherein the selections of portions of the image include selections identifying a window of the first image and, wherein the computer system is operable to include, in the first display element image information sent to the converter, supplemental information such that, responsive to a portion of such a selected window being obscured in its first user display element image by another window in the first image, the selected window's audience display element image includes the obscured portion of the first window.

2. A method comprising the steps of:
   displaying a first image on a display element of a computer system for viewing by a first user;
   receiving, from the user, selections of one or more portions of the image;
   displaying the one or more portions to an audience on respective one or more audience display elements, wherein the entire first image is displayed in view of the first user and only the selected portions are displayed in view of audience;
   sending, to a converter from the computer system, first information for the first display element image and selection data identifying the portions of the image;

generating at least second information by the converter for one or more audience display element images corresponding to the user-selected one or more portions of the first image; and scaling the audience display element images selectively by the converter, so that the audience display element image sizes relative to the audience display elements may be different than the respective sizes of the selected portions of the first image relative to the entire first image or relative to the first display element, wherein the selections of portions of the image include selections identifying a window of the first image and the step of sending first information includes the step of:

sending supplemental information to the converter such that, responsive to a portion of such a selected window being obscured in its first user display element image by another window in the first image, the selected window's audience display element image includes the obscured portion of the first window.

3. A computer program product comprising:

instructions for displaying a first image on a first display element for viewing by a first user;

instructions for receiving user inputs including at least one input selecting one or more portions of the first image;

instructions for sending first information to a converter for generating the first display element image; and instructions for sending first selection data to the converter, responsive to the at least one input, identifying the selected portions of the first image, wherein the converter generates information for one or more audience display element images corresponding to the user-selected one or more portions of the first image and selectively scales the audience display element images, so that the audience display element image sizes relative to the audience display elements may be different than the respective sizes of the selected portions of the first image relative to the entire first image or relative to the first display element, and wherein the entire first image is displayed in view of the first user and only the selected portions are displayed in view of an audience, wherein the selections of portions of the image include selections identifying a window of the first image and the instructions for sending first information include:

instructions for sending supplemental information to the converter such that, responsive to a portion of such a selected window being obscured in its first user display element image by another window in the first image, the selected window's audience display element image includes the obscured portion of the first window.

\* \* \* \* \*